(12) United States Patent
Haller

(10) Patent No.: US 9,718,384 B2
(45) Date of Patent: Aug. 1, 2017

(54) VEHICLE SEAT WITH ADJUSTABLE BACKREST

(71) Applicant: GRAMMER AG, Amberg (DE)

(72) Inventor: Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 45 days.

(21) Appl. No.: 14/824,232

(22) Filed: Aug. 12, 2015

(65) Prior Publication Data

US 2016/0046221 A1    Feb. 18, 2016

(30) Foreign Application Priority Data

Aug. 13, 2014    (DE) .................. 10 2014 011 885

(51) Int. Cl.
| | |
|---|---|
| B60N 2/22 | (2006.01) |
| B60N 2/64 | (2006.01) |
| B60N 2/68 | (2006.01) |
| B60N 2/44 | (2006.01) |
| B60N 2/02 | (2006.01) |

(52) U.S. Cl.
CPC ........... *B60N 2/643* (2013.01); *B60N 2/2222* (2013.01); *B60N 2/449* (2013.01); *B60N 2/68* (2013.01); *B60N 2002/0216* (2013.01); *B60N 2205/30* (2013.01)

(58) Field of Classification Search
CPC ...... B60N 2/22; B60N 2/2213; B60N 2/2222; B60N 2/2231; B60N 2/224; B60N 2/23; B60N 2/231; B60N 2/449; B60N 2/643; B60N 2/68; B60N 2002/0288; A47C 7/40; A47C 7/407

USPC ..................................... 297/452.4
See application file for complete search history.

(56) References Cited

U.S. PATENT DOCUMENTS

| | | | |
|---|---|---|---|
| 567,491 A | * | 9/1896 | Murphy .................. B60N 2/20 |
| | | | 297/232 |
| 633,012 A | | 9/1899 | Kidd et al. |
| | | | (Continued) |

FOREIGN PATENT DOCUMENTS

| | | |
|---|---|---|
| CN | 201124776 | 10/2008 |
| DE | 69111471 | 3/1996 |
| | | (Continued) |

OTHER PUBLICATIONS

Extended Search Report for European Patent Application No. 15180746.8 dated Dec. 11, 2015, 3 pages.
(Continued)

*Primary Examiner* — Robert Canfield
(74) *Attorney, Agent, or Firm* — Sheridan Ross, PC

(57) ABSTRACT

The invention relates to a vehicle seat comprising a seat part and a backrest, the backrest comprising at least one left-hand backrest longitudinal support extending in the vertical direction of the backrest and at least one right-hand backrest longitudinal support extending in the vertical direction of the backrest, the backrest longitudinal supports being attached to the seat part and/or a seat-part frame in a lower end region and comprising at least one cushion element, wherein the length of a distance between the backrest longitudinal supports can be adjusted by means of at least one elongate backrest cross strut arranged in the upper region of the backrest.

14 Claims, 9 Drawing Sheets

(56) References Cited

U.S. PATENT DOCUMENTS

| | | | | |
|---|---|---|---|---|
| 1,400,717 | A | * | 12/1921 | Benson .................... B60N 2/60 160/378 |
| 1,508,859 | A | * | 9/1924 | Schoenhoff ............ B60N 2/449 297/117 |
| 2,534,009 | A | * | 12/1950 | Freasier ................. A47C 7/425 297/230.14 |
| 4,558,904 | A | | 12/1985 | Schultz |
| 5,671,976 | A | * | 9/1997 | Fredrick ................ B60N 2/688 297/284.1 |
| 6,033,026 | A | * | 3/2000 | Tseng .................... A47C 1/023 297/449.1 |
| 6,352,307 | B1 | * | 3/2002 | Engman ............... A61G 5/1059 297/284.1 |
| 6,588,836 | B1 | * | 7/2003 | Lo .......................... A47C 4/283 297/16.1 |
| 7,354,107 | B2 | * | 4/2008 | Kohl ........................ A47C 7/46 297/284.1 |
| 8,141,952 | B2 | * | 3/2012 | Poniatowski ........ B60N 2/0232 297/284.9 |
| 8,991,926 | B2 | | 3/2015 | Johansson |
| 2008/0084104 | A1 | * | 4/2008 | VanHorn ................ A47C 7/546 297/452.4 |
| 2014/0103690 | A1 | * | 4/2014 | Haller .................. B60N 2/2222 297/301.1 |
| 2016/0095443 | A1 | * | 4/2016 | Brodbeck ................ A47C 7/40 297/301.1 |

FOREIGN PATENT DOCUMENTS

| | | |
|---|---|---|
| DE | 19837843 | 2/2000 |
| DE | 102006020671 | 11/2007 |
| DE | 102012109710 | 6/2014 |
| EP | 2719575 | 4/2014 |
| FR | 2828150 | 2/2003 |
| FR | 2972399 | 9/2012 |
| JP | H02-125651 | 10/1990 |
| JP | H03-3256 | 1/1991 |
| JP | H06-14597 | 4/1994 |
| WO | WO 2007/131461 | 11/2007 |

OTHER PUBLICATIONS

Extended Search Report for European Patent Application No. 15180725.2 dated Dec. 10, 2015, 3 pages.

U.S. Appl. No. 14/824,249, filed Aug. 12, 2015, Haller.

Official Action (with English machine translation) for Chinese Patent Application No. 2015104967189, dated Mar. 28, 2017, 27 pages.

Official Action for U.S. Appl. No. 14/824,249, dated Jan. 6, 2017, 11 pages.

Official Action (with English machine translation) for Chinese Patent Application No. 2015104978395 dated Apr. 26, 2017, 17 pages.

Final Action for U.S. Appl. No. 14/824,249, dated May 18, 2017, 7 pages.

* cited by examiner

VEHICLE SEAT WITH ADJUSTABLE BACKREST

CROSS-REFERENCE TO RELATED APPLICATIONS

This application claims the benefit of German Application No. 10 2014 011 885.1 filed Aug. 13, 2014, the contents of which are incorporated herein by reference.

The invention relates to a vehicle seat comprising a seat part and a backrest, the backrest comprising at least one left-hand backrest longitudinal support extending in the vertical direction of the backrest and at least one right-hand backrest longitudinal support extending in the vertical direction of the backrest, the backrest longitudinal supports being attached to the seat part and/or a seat-part frame in a lower end region and comprising at least one cushion element.

Vehicle seats comprising a seat part and a backrest are known from the prior art, in which seats the width of the backrest is narrow or wide depending on the driver or passenger respectively. However, these vehicle seats only have a single backrest width, and so the seating comfort decreases when a driver of a different height and width sits on the seat, for example, since either the backrest is too narrow for the driver, as a result of which the driver does not have optimal back support from the backrest since they do not fit into the shape of the backrest, or the backrest is too wide, as a result of which there is no longer any lateral support. Such seats are also expensive and complex to produce, since a large range of different backrest widths need to be available.

Furthermore, the prior art also discloses child seats which make it possible to widen the backrest by extending said backrest or by pulling out cushion elements which are arranged inside the backrest or by attaching additional cushion elements to the backrest. In this case, supports or cushion elements respectively that are inside the backrest are for example pulled outwards over the entire height of the backrest, as a result of which it is possible to use the child seat for a longer period of time as the child grows up. However, such a structure does not meet the requirements of a vehicle seat in terms of safety, since the supports which are pulled out or attached respectively do not allow the driver to be supported safely. Furthermore, by pulling out the cushion parts over the entirety of the vertical direction, the width of the backrest is also increased in the pelvic region, and this leads to a lack of support in this region.

The object of the present invention is therefore to further develop generic vehicle seats in such a manner to make it possible, by way of a simple structure of the seat, for the driver or passenger respectively to rapidly and safely adjust the backrest in an upper region, with optimal support in the pelvic region at the same time, and to rapidly and simply adjust the seat to make it comfortable for the passenger. At the same time, such a seat also minimises production costs since it is now possible to set various widths of the backrest using one seat.

This object is solved according to the features of the claimed invention. Advantageous embodiments of the invention can be found in the dependent claims.

A central concept of the invention is that in a vehicle seat comprising a seat part and a backrest, the backrest comprising at least one left-hand backrest longitudinal support extending in the vertical direction of the backrest and at least one right-hand backrest longitudinal support extending in the vertical direction of the backrest, the backrest longitudinal supports being attached to the seat part and/or a seat-part frame in a lower end region and comprising at least one cushion element, the length of a distance between the backrest longitudinal supports can be adjusted by means of at least one elongate backrest cross strut arranged in the upper region of the backrest.

Here, "distance" describes the distance between sides of two adjacent backrest longitudinal supports that are facing each other, for example between the left-hand and right-hand backrest longitudinal supports. The terms "width" or "width of the backrest" respectively may also be used synonymously with the term "distance".

Here, a "backrest longitudinal support" is understood to be an element which is connected to the seat part and/or the seat-part frame in the lower end region thereof and extends preferably continuously in the vertical direction of the backrest as far as an upper end region.

Likewise, the backrest cross strut is an element which extends substantially in the width direction of the seat and is preferably connected to the backrest longitudinal supports. Here, it is conceivable for the backrest cross strut to be straight or also curved. Furthermore, it is also possible for the backrest to consist of a resilient and/or deformable material, expandable materials also being conceivable.

In this context, the backrest may be a fixed backrest or a backrest which can swivel about an axis relative to the seat part.

Owing to this design, it is possible for a person sitting on such a vehicle seat according to the invention to individually adjust the width of the backrest in an upper region, that is to say in the region of the chest and shoulders respectively, to the width of the chest and shoulders respectively of the driver in question. As a result, it is also possible to optimally adjust the width of the backrest in the upper region and the seating comfort to the requirements of the respective driver without great complexity when the driver changes.

Even after the backrest width has been adjusted, the width remains unchanged in a lower region of the backrest, for example in the region of the hips. As a result, support is still provided, particularly in the lateral direction of the backrest. It is not necessary to change the width in the lower region, since the physique of an adult generally does not differ significantly in this region, unlike the upper back region of the driver.

Furthermore, it is ensured that the driver is safely supported in each setting of the backrest, since cushion parts are not pulled out or attached respectively, as in the prior art, but rather the shape or the arrangement respectively of the backrest components to which at least one cushion element is attached, in particular the backrest longitudinal supports, is changed in order to vary the width. As a result, the driver's back is still supported by the robust components of the backrest.

By means of the present invention, a particularly simple structure of the backrest is also provided by the left-hand and right-hand backrest longitudinal supports and the at least one backrest cross strut, the at least one backrest cross strut preferably being connected to the backrest longitudinal supports. As a result, it is possible to further stabilise the backrest by connecting the backrest supports to the at least one backrest cross strut.

It is conceivable to adjust the distance between the backrest longitudinal supports by means of at least one backrest strut, of which the length can be adjusted, and/or by displacing the at least one backrest cross strut along the vertical direction of the backrest.

According to a first embodiment, with the length of the at least one backrest cross strut being adjustable, the distance is adjusted by adjusting the length of the at least one backrest cross strut. Possible configurations of the at least one backrest cross strut are a rotary spindle of which the length can be adjusted by being rotated, or a lifting cylinder of which the length can be adjusted by applying pressure, or said cross strut consisting of two elements having complementary toothed portions which mesh with one another.

According to another embodiment, it is conceivable for the at least one backrest cross strut to be adjusted synchronously or asynchronously with respect to a centre of the longitudinal extension of the backrest cross strut. As a result, the width of the backrest may not be uniform, but rather the width thereof is adjusted to a greater extent on one side of the backrest than on the other side of the backrest. It is therefore possible for the width of the backrest to be adapted, if necessary, to a curved back or to a working situation, such as for example operating a joystick or the like on an armrest, as a result of which the width of the shoulders is changed by an arm movement.

In this case, both the rotary spindle and the lifting cylinder may be symmetrical or asymmetrical per se.

According to a second embodiment, with the at least one backrest cross strut being displaceable along the vertical direction of the backrest, preferably on one or more backrest longitudinal supports, the distance is adjusted in such a way that the position or the location respectively of the at least one backrest cross strut is adjusted. For example, the at least one backrest cross strut may be moved out of a horizontal position into a position in which it is at an angle to the horizontal position. As a result, the length which is projected onto the horizontal position is shortened, and this brings about a change in the distance overall. It is also conceivable for the at least one backrest cross strut to be moved out of a position in which it is at an angle to the horizontal position into a horizontal position, and this involves an increase in the distance.

It is of course also conceivable to combine these two embodiments, as a result of which it is possible to simultaneously move the at least one backrest cross strut along the vertical direction of the backrest and to adjust the length of the at least one backrest cross strut. As a result, there are many options for adjusting the backrest itself and the distance.

According to a further embodiment, the backrest comprises at least one middle backrest longitudinal support which extends in the vertical direction of the backrest, is preferably connected to the at least one backrest cross strut and is attached to the seat part and/or the seat-part frame in a lower end region.

This middle backrest longitudinal support is therefore arranged between the left-hand and right-hand backrest longitudinal supports.

It is also conceivable for the backrest longitudinal support to be arranged such that it can provide the spine region with additional support, and this results in good overall back support and a comfortable sitting position for the driver.

Here, the middle backrest longitudinal support may comprise at least one separate cushion element or may be connected to the cushion element(s) of the left-hand and right-hand backrest supports. Therefore, the backrest may thus comprise a cushion part that is for example continuous on the backrest longitudinal supports, or each backrest longitudinal support comprises an independent cushion part.

It is possible to arrange the backrest longitudinal supports on the seat part and/or the seat-part frame so as to be either rigid or movable, preferably such that it can swivel about an axis. According to an embodiment, the left-hand and the right-hand backrest longitudinal support and/or the middle backrest longitudinal support are each attached in the lower region thereof to the seat part and/or the seat-part frame in a swiveling manner. It is in particular advantageous for the middle backrest longitudinal support not to be able to swivel, since this ensures continuous support in the drivers spine region. If, however, all the backrest longitudinal supports are arranged so as to swivel, it is possible for the entirety of the backrest to swivel. In particular, it is advantageous for the pivot axes of the backrest longitudinal supports not to be parallel to one another but to at least be in a common plane, as a result of which the backrest swivels as a whole in a helical or torsional manner respectively so as to fit with the ergonomics of the person, particularly when their upper body turns in a viewing direction or into a working position respectively that faces to the side or to the rear.

It is, however, also possible to adjust the distance when the backrest is in a swiveled state.

Particularly advantageously, the distance can be adjusted if a first backrest cross strut is arranged between the left-hand and the middle backrest longitudinal supports and a second backrest cross strut is arranged between the right-hand and the middle backrest longitudinal supports.

It is conceivable for the lengths of the first and the second backrest cross struts to be adjusted independently of each other. An arrangement of two backrest cross struts also has an advantageous effect on any potential torsional swiveling of the backrest, since the upper region of each backrest longitudinal support can better follow the helical swiveling.

It is therefore particularly advantageous for the at least one backrest cross strut to be attached to the backrest longitudinal supports by means of link joints. As a result, helical swiveling can be particularly well followed.

Preferably, the connections, particularly advantageously the link joints, of the at least one backrest cross strut to the backrest longitudinal supports are arranged at the sides, on an upper end or in a rear region of the backrest longitudinal supports.

By means of such a hinged connection, it is particularly advantageously possible to swivel the backrest and/or to displace the at least one backrest cross strut along the vertical direction of the backrest, in particular if the at least one backrest cross strut is moved along one, preferably the middle backrest longitudinal support, or two backrest longitudinal supports.

According to a further embodiment, the at least one backrest cross strut can in this respect be adjusted electrically or by means of a motor or manually respectively. For example, the rotary spindle may be rotated by a motor or may be rotated manually. Furthermore, it is also conceivable for the at least one backrest cross strut to also be moved or displaced respectively along the vertical direction of the backrest electrically or by means of a motor or manually respectively.

According to a further embodiment, the at least one backrest cross strut is connected to an ellipsoid element which is rotatable about a rotary shaft which is provided at an angle to the vertical direction of the backrest. In this case, the ellipsoid element is arranged on one of the backrest longitudinal supports. An end region of the backrest cross strut is preferably attached in the region of a focus. By rotating this ellipsoid element, the backrest cross strut is moved such that the backrest cross strut is moved and the distance is adjusted.

Preferably, the rotatable ellipsoid element interconnects the first backrest cross strut and the second backrest cross strut in end regions that face each other. Likewise, the end regions are each also arranged in the region of a focus, the ellipsoid element preferably being arranged on a middle backrest longitudinal support.

In order to adjust the distance as advantageously as possible, the at least one backrest cross strut is preferably arranged, in terms of the vertical direction of the backrest, in the upper half of the backrest, more preferably in the upper third of the backrest and most preferably in the upper quarter of the backrest.

In order to ensure as long a service life of the seat as possible, it is advantageous for the respective components of the backrest, that is to say the backrest longitudinal supports, the backrest cross strut and also the connections to the seat part and/or the seat-part frame, to be detachable and therefore easy to replace. It is particularly advantageous for the at least one backrest cross strut to be detachably connected to the backrest longitudinal supports.

It is, however, also conceivable for the at least one backrest cross strut to be permanently connected to the backrest longitudinal supports.

There are many materials which may be selected for the backrest longitudinal supports and/or the at least one backrest cross strut; however, said components will generally consist either of a metal or a resilient material, preferably plastics material.

Further advantageous embodiments emerge from the dependent claims.

Additional aims, advantages and expediencies of the present invention emerge in the following from the description in conjunction with the drawings, in which.

Figure 1:
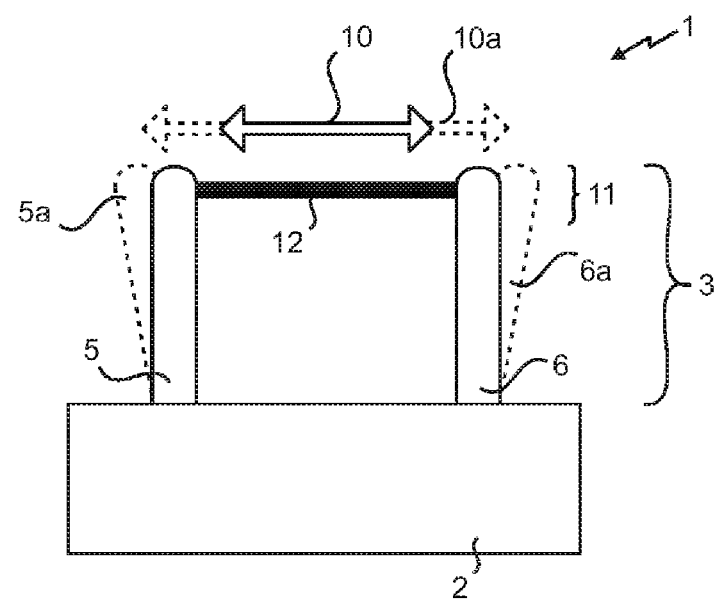
FIG. 1 is a schematic front view of a vehicle seat according to the invention, comprising a seat part and a backrest, which comprises a left-hand and a right-hand backrest longitudinal support and a backrest cross strut.
Figure 8:
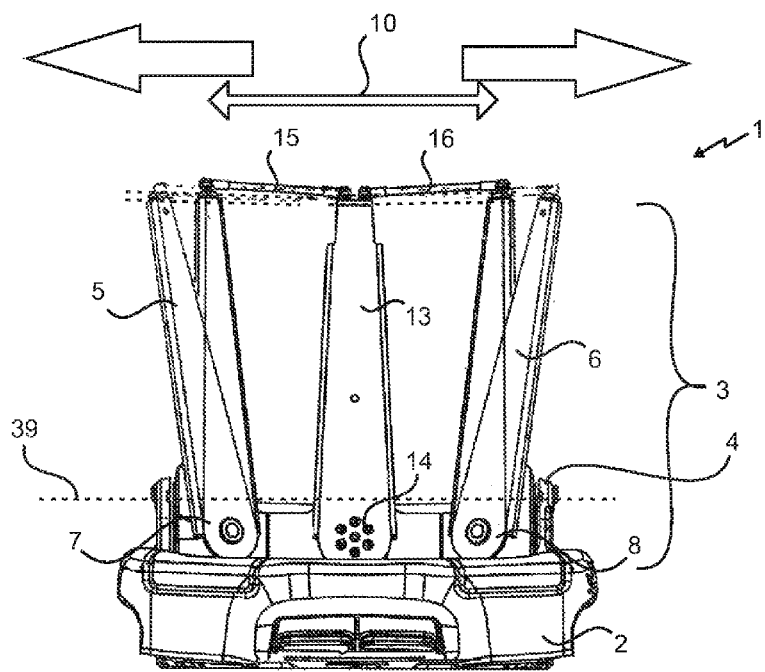
FIG. 8 is a schematic front view of a vehicle seat according to the invention having an adjusted distance according to an embodiment comprising a first and a second backrest cross strut.

The vehicle seat 1 shown in a schematic front view in FIG. 1 comprises a seat part 2 for seating a passenger and a backrest 3 for supporting the passengers back. In this respect, the backrest 3 comprises a left-hand backrest longitudinal support 5 and a right-hand backrest longitudinal support 6 and a backrest cross strut 12. In this respect, the backrest longitudinal supports 5, 6 are attached in the lower end regions 7, 8 (as shown in FIG. 8) thereof to the seat part 2 or the seat-part frame 4 (not shown here) respectively, and comprise at least one cushion element (not shown here). The attachment of the backrest longitudinal supports 5, 6 to the seat part and/or the seat-part frame may in this case be a rigid connection or a connection in such a manner that the backrest longitudinal supports 5, 6 can each swivel about a pivot axis, the pivot axes not only extending in parallel but being in a common plane and each forming an angle relative to one another or possibly even being skew relative to one another. In this respect, the backrest longitudinal supports 5, 6 may also be displaceably connected to the seat part 2 and/or the seat-part frame 4. The backrest 3 as a whole can swivel about a longitudinal axis 39 (not shown here) relative to the seat part 2. The dashed parts in the figure show a vehicle seat having an adjusted distance 10 *a*, and backrest supports 5 *a* and 6 *a* of which the position has been adjusted owing to the distance being adjusted.

FIG. 1 also schematically shows the adjustment of the distance 10 to a new distance 10*a*, indicated by the dashed lines.

Figure 2:
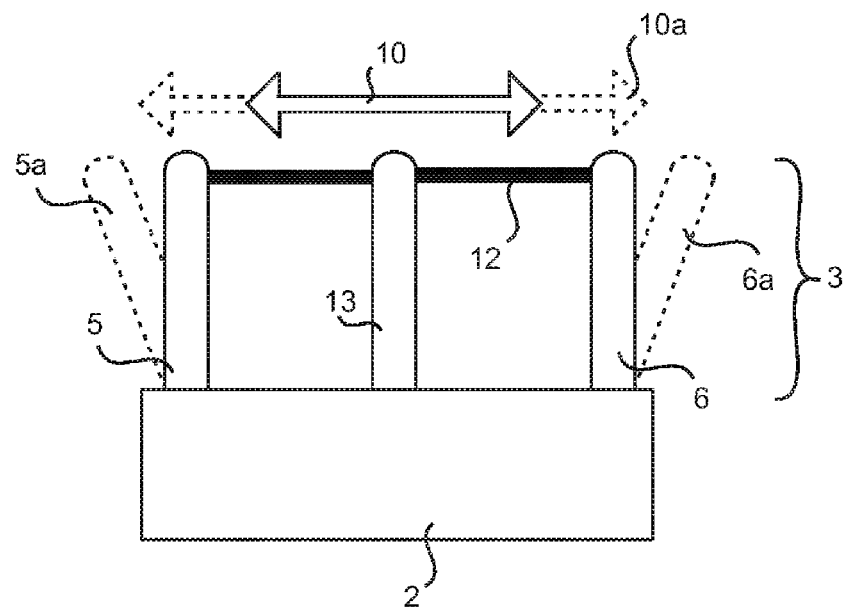
FIG. 2 is a schematic view of the vehicle seat according to FIG. 1, additionally comprising a middle backrest longitudinal support.

As can be seen in particular in FIG. 2, a middle backrest longitudinal support 13 is preferably also possible, which is arranged between the left-hand backrest longitudinal support 5 and the right-hand backrest longitudinal support 6 and is also connected by a lower end region (not shown) to the seat part 2 and/or the seat-part frame 4 (not shown). As a result, it is possible to provide the passenger with additional support, in particular in the spine region, and this results in increased seating comfort.

Likewise, as in FIG. 1, FIG. 2 also indicates the adjustment of the distance 10 by dashed lines. The dashed parts in the figure in this respect show a vehicle seat having an adjusted distance 10*a*, and backrest supports 5*a* and 6*a* of which the position has been adjusted owing to the distance being adjusted.

Preferably, the backrest longitudinal supports 5, 6, 13 are connected to the backrest cross strut 12, as a result of which the stability of the backrest 3 can be increased. Yet more preferably, in this respect, the connections between the respective components are hinged, for example are formed by a joint head 24 which is engaged with a corresponding component and thus provides a hinged connection, as can be seen for example in FIG. 10A. Furthermore, yet more options for connecting the backrest longitudinal supports 5, 6, 13 and the backrest cross strut 12 are conceivable which permanently or detachably interconnect the backrest longitudinal supports 5, 6, 13 and the backrest cross strut 12. Examples of a permanent connection are welding, riveting or bonding the components, and examples of a detachable connection are a screwed connection, the above-mentioned hinged connection or even a magnetic connection which can for example be established by permanent magnets or electromagnets. All the options that are known to a person skilled in the art are also conceivable for connecting components.

As can be seen clearly from the rest of the drawings, there are various approaches for adjusting the distance 10 or the width of the backrest 3 respectively.

Figure 3:
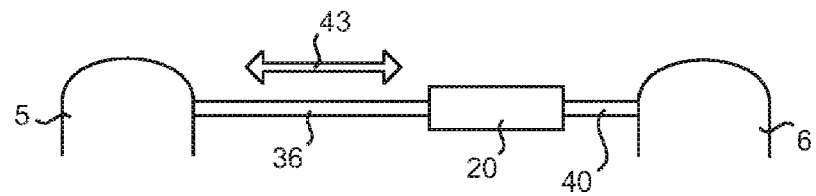
FIG. 3 shows a backrest cross strut which is designed as a lifting cylinder.

In addition, according to one embodiment, FIG. 3 shows the backrest cross strut 12 that is arranged between the left-hand backrest longitudinal support 5 and the right-hand backrest longitudinal support 6 and is designed as a lifting cylinder 20. This lifting cylinder 20 may be symmetrical or asymmetrical, and is optionally supplied with the necessary pressure by an outer source (not shown here) in order to allow the piston 36 to retract and extend, as shown by the arrow. The lifting cylinder 20 is attached to the backrest longitudinal supports 5, 6 by means of connections 40. Here, the arrow 43 indicates the movement direction of the piston 36.

Figure 4:
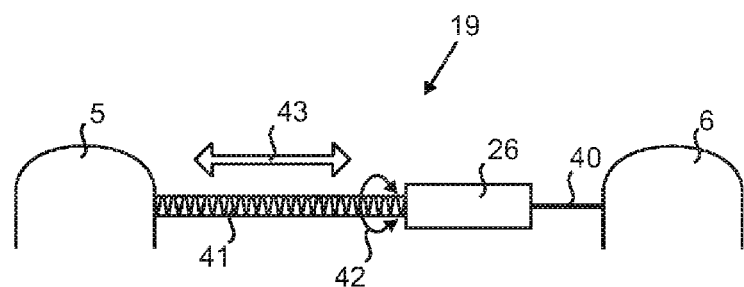
FIG. 4 shows a backrest cross strut which is designed as a rotary spindle.

Another design option for the backrest cross strut 12 is shown in FIG. 4. Here, the backrest cross strut 12 is designed as a rotary spindle 19, which optionally comprises a sheath 26. By rotating the sheath 26, or even the spindle 19 itself, the spindle 19 is moved into or out of the sheath 26, as a result of which the overall length of the rotary spindle 19 is adjusted and therefore the distance 10 is also adjusted. It is also possible for the attachments 17 to be directly connected to the spindle 19 and for the spindle 19 to be moved by rotating in the attachments 17, as a result of which the distance 10 is adjusted. Here, the arrow 42 indicates the rotational direction of the rotary spindle, and the arrow 43 again indicates the movement direction, in this case of the rotary spindle, in particular of the threaded rod 41.

Figure 5:
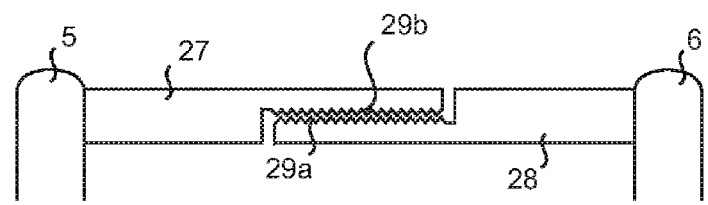
FIG. 5 shows a backrest cross strut comprising two backrest cross strut parts comprising toothed portions.

It is also possible for the backrest cross strut 12, as shown in FIG. 5, to be divided into a first backrest cross strut part 27 and a second backrest cross strut part 28, which each comprise a toothed portion 29a and 29b respectively. The toothed portions 29a, 29b are in this respect formed such that they can mesh with one another and thus establish a connection. By releasing the toothed connection, it is therefore possible to adjust the length by moving the two backrest cross strut parts 27, 28 away from each other or towards each other, and this again results in an adjustment of the distance 10.

One design option for adjusting the distance, which is independent of the type of design of the backrest cross strut 12 or of the backrest cross struts 15, 16 respectively, is described in the following FIGS. 6A-6C and 7A-7C respectively.

Figure 6A:
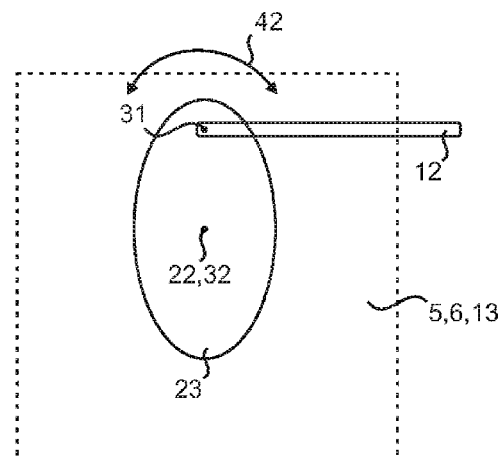
FIG. 6A shows a starting position of an ellipsoid element.
Figure 6B:
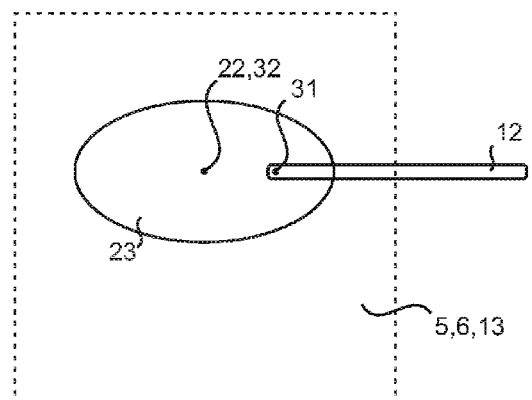
FIG. 6B shows a first adjustment of an ellipsoid element after rotating in a direction according to FIG. 6A.
Figure 6C:
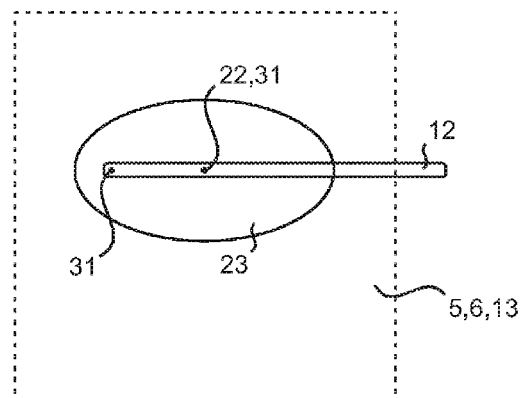
FIG. 6C shows a second adjustment of an ellipsoid element after rotating in another direction according to FIG. 6B.

With reference to FIG. 6A-6C, at least one ellipsoid element 23 is provided which is rotatable about a rotary shaft 22 provided at an angle to the vertical direction of the backrest and is arranged on one of the backrest longitudinal supports 5, 6, 13. The rotary shaft 22 is preferably arranged in the centre 32 of the ellipsoid element 23, which may in particular be designed as an ellipse, that is to say at the intersection of the large and small semi-axes. However, any other point on the ellipse 23 is also possible as the point of rotation 22. However, the backrest cross strut 12 is preferably attached at one of the two foci of the ellipse 23, although any other point on the ellipse 23 is conceivable as an attachment point 31 here too, provided that this attachment point 31 is not the same as the point of rotation 22 of the ellipse 23, and this ensures that the backrest cross strut 12 actually moves. The arrow 42 indicates the rotational direction of the ellipsoid element here too.

Starting from a possible starting position, as shown in FIG. 6A, the distance is accordingly adjusted depending on the rotational direction and the attachment to the backrest longitudinal supports 5, 6, 13 of the ellipsoid element 23. FIGS. 6B and 6C show the different rotational positions.

Figure 7A:
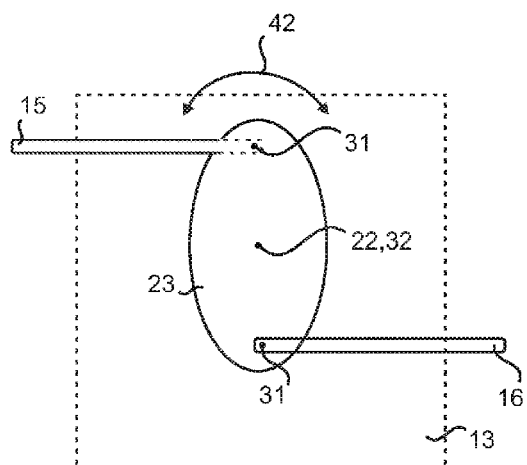
FIG. 7A is a view of another embodiment having an ellipsoid element in a starting position.
Figure 7B:
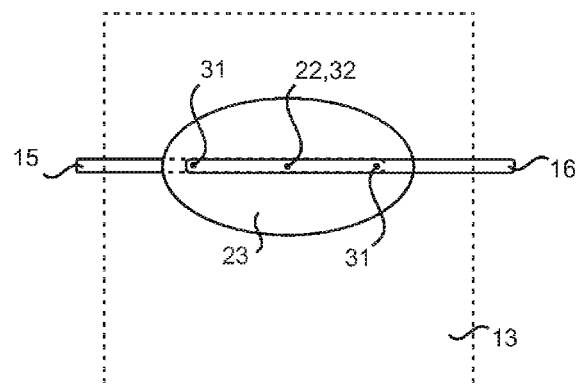
FIG. 7B shows a first adjustment of the ellipsoid element after rotating in a direction according to FIG. 7A.
Figure 7C:
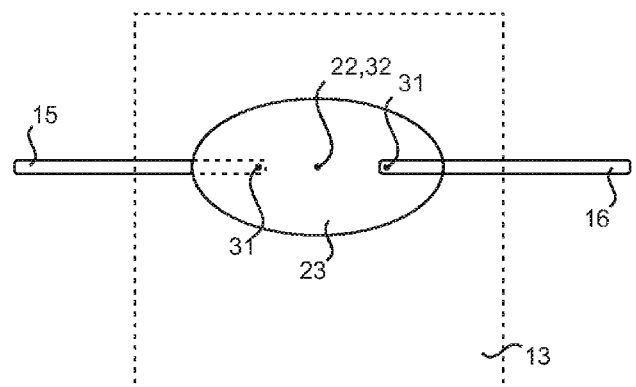
FIG. 7C shows a second adjustment of the ellipsoid element after rotating in another direction according to FIG. 7C.

Another way to use the ellipsoid element 23 is shown in FIG. 7A to 7C. The ellipsoid element 23 may for example be attached to the middle backrest longitudinal support 13 and may interconnect a first backrest cross strut 15, which is arranged between the left-hand backrest longitudinal support 5 and the middle backrest longitudinal support 13, and a second backrest cross strut 16, which is arranged between the right-hand backrest longitudinal support 6 and the middle backrest longitudinal support 13, such that the first backrest cross strut 15 and the second backrest cross strut 16 are attached to the ellipse by end regions 30a, 30b that face each other. The attachment points 31 and the point of rotation 22 of the ellipsoid element 23 cannot coincide here either.

Depending on the rotational direction of the ellipsoid element 23, in this respect the end regions 30a, 30b of the first backrest cross strut 15 and of the second backrest cross strut 16 are moved away from or towards each other, as a result of which the distance 10 is again adjusted. The different rotational positions, starting from the starting position shown in FIG. 7A, are shown in FIGS. 7B and 7C.

FIG. 8 shows, in a front view of the vehicle seat according to the invention, an adjustment to the distance 10, again by way of example, by means of a first backrest cross strut 15 and a second backrest cross strut 16. By adjusting the length of the first backrest cross strut 15 and/or the second backrest cross strut 16, the distance 10 is adjusted. In this case, the backrest longitudinal supports 5, 6, 13 may be connected to the seat part 2 and/or the seat-part frame 4 either rigidly or such that they can swivel.

Figure 9A:
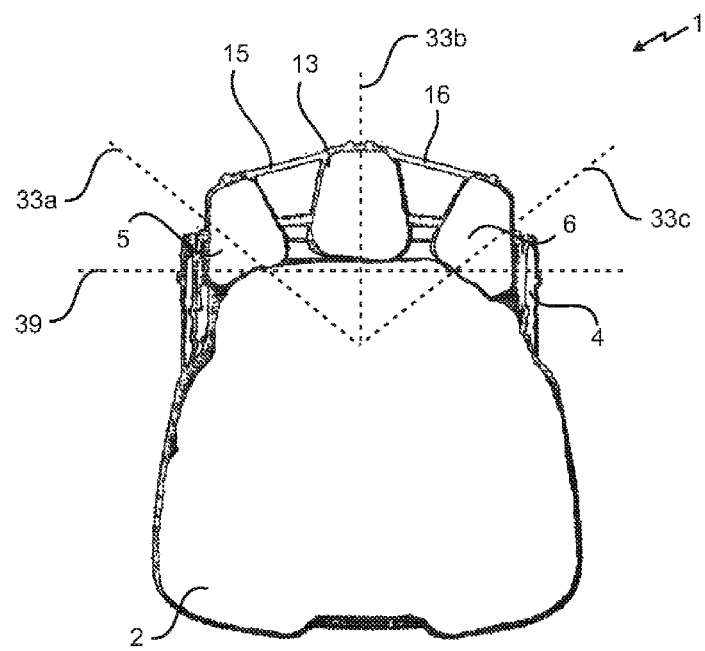
FIG. 9A is a schematic plan view of a vehicle seat according to the invention comprising backrest longitudinal supports which can swivel and are in an unswiveled state.
Figure 9B:
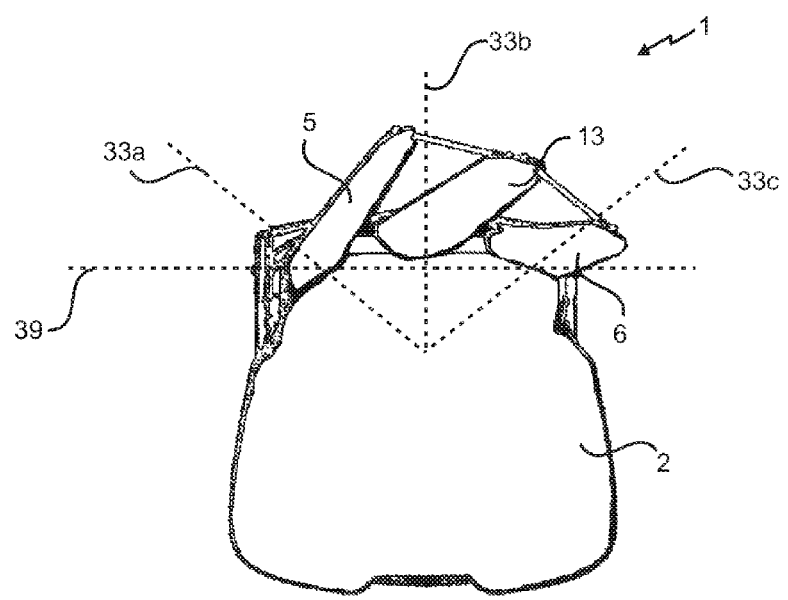
FIG. 9B is a schematic plan view of a vehicle seat according to the invention comprising backrest longitudinal supports which can swivel and are in a swiveled state.

An arrangement having a first backrest cross strut 15 and a second backrest cross strut 16 is advantageous in particular if the backrest longitudinal supports 5, 6, 13 can swivel, and in particular if the pivot axes 33a, 33b, 33c do not extend in parallel, but are preferably in a common plane. Such an arrangement of the backrest longitudinal supports is shown in FIGS. 9A and 9B, FIG. 9A showing the vehicle seat 1 when it is not swiveled and FIG. 9B showing the vehicle seat 1 when it is swiveled. It can be seen in particular from FIG. 9B that it is advantageous for a first backrest cross strut 15 and a second backrest cross strut 16 to be used for swiveling the backrest longitudinal supports 5, 6, 13, since the left-hand backrest longitudinal support 5 and the right-hand backrest longitudinal support 6 extend in different directions when swiveling is taking place. Therefore, it is advantageous for it to be possible for the region between the left-hand backrest longitudinal support 5 and the middle backrest longitudinal support 13 and the region between the middle backrest longitudinal support 13 and the right-hand backrest longitudinal support 6 to move independently of each other, this being made possible precisely by the first backrest cross strut 15 and the second backrest cross strut 16. Although it would be possible to only use a single backrest cross strut 12, which is made of resilient material for example, however, forces act on the backrest longitudinal supports 5, 6, 13 owing to the deformation of the backrest cross strut 12, such that said longitudinal supports themselves are also possibly deformed by these forces and/or that a restoring force, which acts counter to the movement of the backrest longitudinal supports 5, 6, 13, arises owing to the active forces.

Owing to the swiveling of the backrest 3 as shown in FIG. 9B, it is as a whole possible to deform the backrest 3 in a helical or torsional manner respectively, this deformation being adapted to an upper body that is turned to face the rear and to thus allow good support of the passenger in a working posture that faces the rear.

FIGS. 10A to 10C and 11A to 11C show an essentially different method for adjusting the distance.

Here, the adjustment is not mainly brought about by adjusting the length of the at least one backrest cross strut 12, but by adjusting the position of the backrest cross strut 12. By way of example, FIGS. 10B and 11B are front views, FIGS. 10A and 11A are rear views and FIGS. 10C and 11C are plan views of the arrangement of the backrest cross strut 12, in particular of a first backrest cross strut 15 and a second backrest cross strut 16, on the backrest longitudinal supports 5, 6, 13.

In this case, the first backrest cross strut 15 and the second backrest cross strut 16 are preferably hingedly attached to the backrest longitudinal supports 5, 6, 13 by means of link joints 24, and in particular the backrest cross struts 15, 16 are attached to the middle backrest longitudinal support 13 such that it is possible to displace the backrest cross strut 12, in particular the end regions 30*a*, 30*b* that face each other. For this purpose, the end regions 30*a*, 30*b* of the backrest cross struts 15, 16 are preferably attached to the middle backrest longitudinal support 13 by means of a device, a displacement device 34 allowing the end regions 30*a*, 30*b* of the backrest cross struts 15, 16 to be displaced downwards and upwards relative to the vertical direction of the backrest. Such a displacement may for example be brought about by means of a motor 35, which moves on the middle backrest longitudinal support 13 along the vertical direction of the backrest; however, other options are also conceivable. Such options are for example a mechanical movement, for example by rotating a rotary spindle, or by the application of a spring force, or a movement by means of a pneumatic cylinder.

Figure 10A:
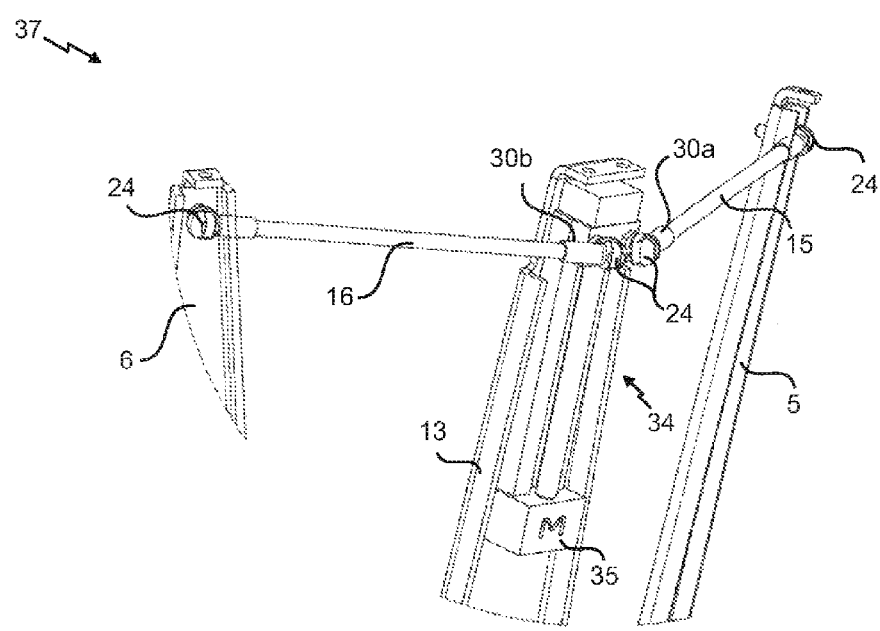
FIG. 10A is a schematic rear view of the backrests according to an embodiment comprising backrest cross struts, which are adjustable along the vertical direction of the backrest, in a first position.
Figure 10B:
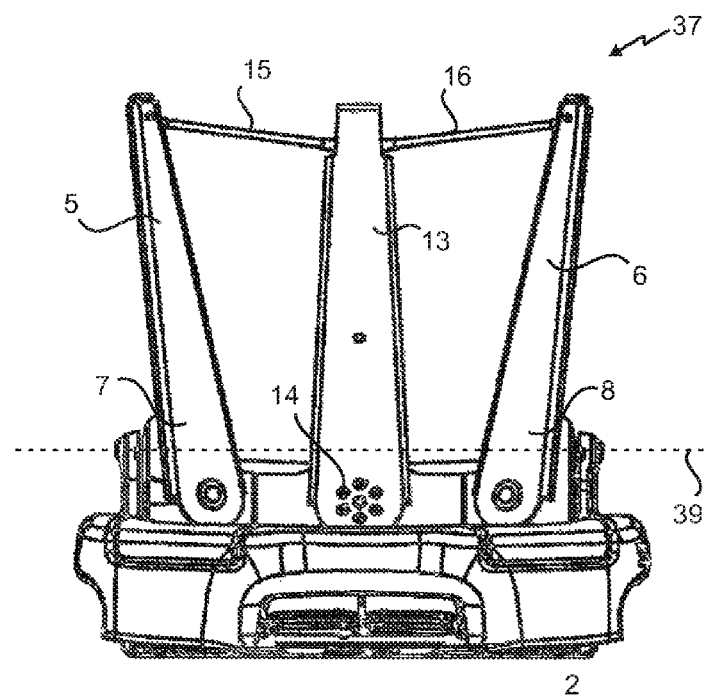
FIG. 10B is a schematic front view of the vehicle seat according to FIG. 10A.
Figure 10C:
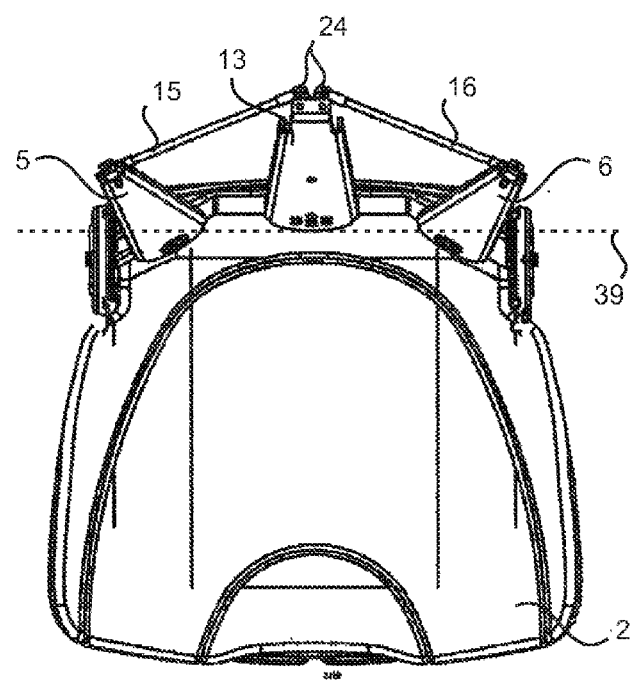
FIG. 10C is a schematic plan view of the vehicle seat according to FIG. 10A.
Figure 11A:
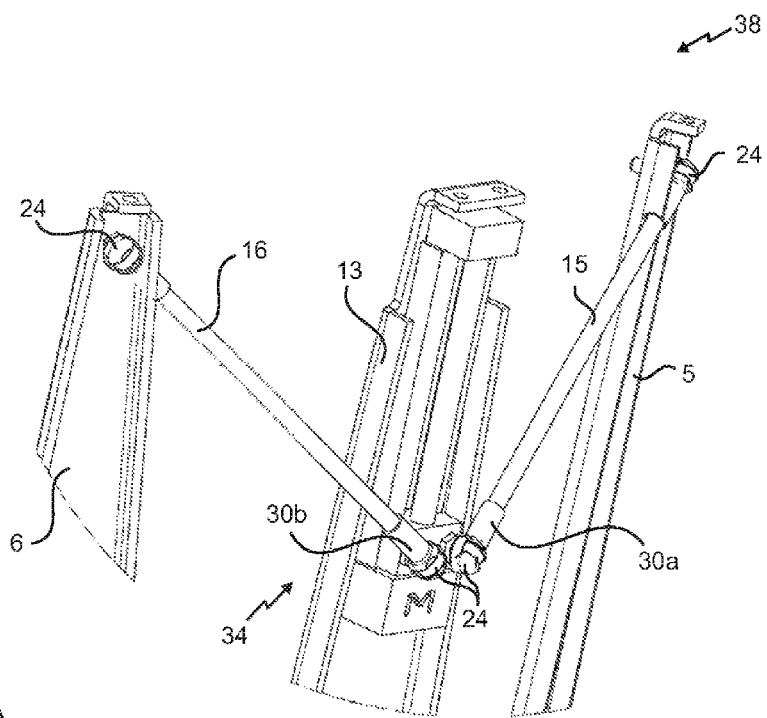
FIG. 11A is a schematic rear view of the backrests according to an embodiment comprising backrest cross struts, which are adjustable in the vertical direction of the backrest, in a second position.
Figure 11B:
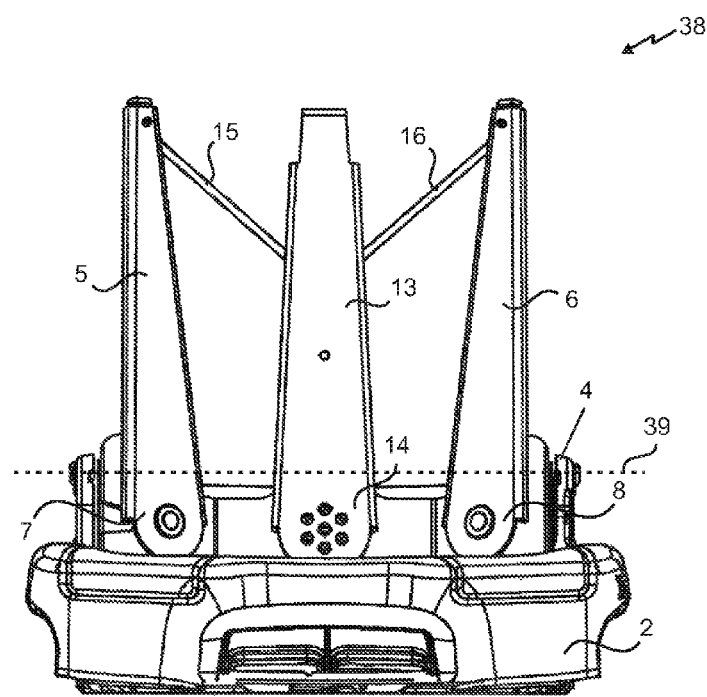
FIG. 11B is a schematic front view of the vehicle seat according to FIG. 11A.
Figure 11C:
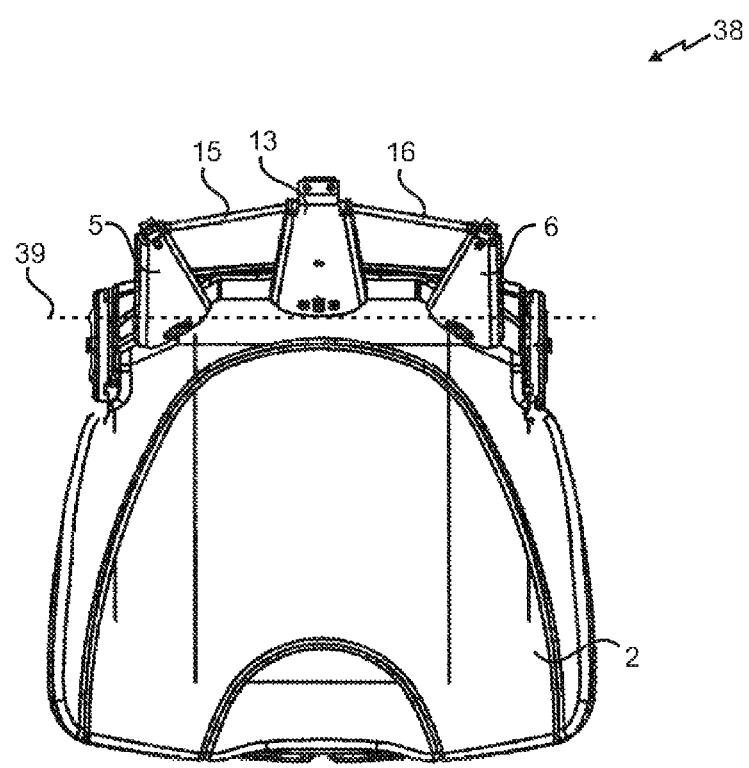
FIG. 11C is a schematic plan view of the vehicle seat according to FIG. 11A.

FIG. 10A shows a first position 37, in which the backrest cross struts 15, 16 are in the uppermost position relative to the vertical direction of the backrest. In this example, this first position 37 is synonymous with a maximum distance 10.

If the displacement device 34 is moved downwards relative to the vertical direction of the backrest, then the distance 10 decreases owing to the position of the backrest cross struts 15, 16 being adjusted, and this results in a narrower backrest width. In this respect, FIG. 11A shows a second position 38, in which the backrest cross struts 15, 16 are in a lowermost position relative to the vertical direction of the backrest. In this example, this second position 38 is synonymous with a minimum distance 10.

Although FIGS. 10A to 10C and 11A to 11C show the backrest cross struts 15, 16 as having a set length, it is also possible to use the above-described backrest cross struts 12, 15, 16, of which the length can be adjusted, in conjunction with the displacement device 34. As a result, a large adjustment range for the distance 10 and for the width of the backrest 3 respectively is possible for the passenger. In particular, a synchronous or asynchronous adjustment of the distance 10 is possible, synchronous and asynchronous referring to the adjustment of the length of the first backrest cross strut 15 and the second backrest cross strut 16 in this case.

All of the features disclosed in the application documents are claimed as being essential to the invention if they are novel over the prior art individually or in combination.

LIST OF REFERENCE NUMERALS 1 vehicle seat
2 seat part
3 back rest
4 seat-part frame
5 left-hand backrest longitudinal support
5*a* left-hand backrest longitudinal support
6 right-hand backrest longitudinal support
6*a* right-hand backrest longitudinal support
7 lower end region
8 lower end region
10 distance
10*a* adjusted distance
11 upper region
12 backrest cross strut
13 middle backrest longitudinal support
14 lower end region
15 first backrest cross strut
16 second backrest cross strut
17 link joint
18 central axis
19 rotary spindle
20 lifting cylinder
21 toothed element
22 rotary shaft/point of rotation
23 ellipsoid element
24 joint head
26 sheath
27 first backrest cross strut part
28 second backrest cross strut part
29*a* toothed portion
29*b* toothed portion
30*a* end region
30*b* end region
31 attachment point
32 central point of the ellipsoid element
3*a* pivot axis
33*b* pivot axis
33*c* pivot axis
34 displacement device
35 motor
36 piston
37 first position
38 second position
39 pivot axis
40 connection
41 threaded rod
42 rotational direction
43 movement direction

What is claimed is:

1. A vehicle seat comprising a seat part and a backrest, the backrest comprising at least one left-hand backrest longitudinal support extending in the vertical direction of the backrest and at least one right-hand backrest longitudinal support extending in the vertical direction of the backrest, the backrest longitudinal supports each being attached to the seat part or a seat-part frame at a pivot axis in a lower end region, wherein the length of a distance between the backrest longitudinal supports can be adjusted by at least one elongate backrest cross strut arranged in the upper region of the backrest by adjusting the length of the backrest cross strut and/or by displacing the backrest cross strut along the vertical direction of the backrest on one or more backrest longitudinal supports, and wherein a distance between the pivot axis of each backrest longitudinal support remains unchanged in the lower region of the backrest.

2. The vehicle seat according to claim 1, wherein the at least one backrest cross strut is connected to the backrest longitudinal supports.

3. The vehicle seat according to claim 1, wherein the backrest comprises at least one middle backrest longitudinal support which extends in the vertical direction of the backrest, is connected to the at least one backrest cross strut and is attached in a lower end region to the seat part or the seat-part frame.

4. The vehicle seat according to claim 3, wherein the left-hand and right-hand backrest longitudinal supports and/or the middle backrest longitudinal support are each attached in the lower region thereof to the seat part or the seat-part frame to swivel about a pivot axis, respectively.

5. The vehicle seat according to claim 3, wherein a first backrest cross strut is arranged between the left-hand and the middle backrest longitudinal supports and a second backrest cross strut is arranged between the right-hand and the middle backrest longitudinal supports.

6. The vehicle seat according to claim 1, wherein the at least one backrest cross strut is attached to the backrest longitudinal supports by means of link joints.

7. The vehicle seat according to claim 1, wherein the length of the at least one backrest cross strut can be adjusted synchronously or asynchronously with respect to a centre of the longitudinal extension of the at least one backrest cross strut and can be adjusted electrically or by means of a motor or manually respectively.

8. The vehicle seat according to claim 1, wherein the at least one backrest cross strut is a rotary spindle of which the length can be adjusted by being rotated or is a lifting cylinder of which the length can be adjusted by applying pressure, or consists of a first backrest cross strut part and a second backrest cross strut part having complementary toothed portions which mesh with one another.

9. The vehicle seat according to claim 1, wherein the at least one backrest cross strut is connected to an ellipsoid element which is rotatable about a rotary shaft which is provided at an angle to the vertical direction of the backrest.

10. The vehicle seat according to claim 9, wherein the rotatable ellipsoid element interconnects a first backrest cross strut and a second backrest cross strut in end regions that face one another.

11. The vehicle seat according to claim 1, wherein the at least one backrest cross strut is arranged in the upper third of the backrest relative to the vertical direction of the backrest.

12. The vehicle seat according to claim 1, wherein the at least one backrest cross strut is permanently or detachably connected to the backrest longitudinal supports.

13. The vehicle seat according to claim 1, characterized in that the backrest longitudinal supports and/or the at least one backrest cross strut consist of metal or a resilient material.

14. A vehicle seat comprising a seat part and a backrest, the backrest comprising at least one left-hand backrest longitudinal support extending in the vertical direction of the backrest and at least one right-hand backrest longitudinal support extending in the vertical direction of the backrest, the backrest longitudinal supports being attached to the seat part or a seat-part frame in a lower end region;

wherein the length of a distance between the backrest longitudinal supports can be adjusted by means of at least one elongate backrest cross strut arranged in the upper region of the backrest, and wherein the at least one backrest cross strut is connected to an ellipsoid element which is rotatable about a rotary shaft which is provided at an angle to the vertical direction of the backrest.

* * * * *